No. 633,914. Patented Sept. 26, 1899.
F. SIMONET.
MACHINE FOR CUTTING SUGAR.
(Application filed Jan. 16, 1899.)
(No Model.) 4 Sheets—Sheet 1.

WITNESSES:
John Lotka
Julius Statz

INVENTOR
Francis Simonet.
BY
ATTORNEYS

No. 633,914. Patented Sept. 26, 1899.
F. SIMONET.
MACHINE FOR CUTTING SUGAR.
(Application filed Jan. 16, 1899.)
(No Model.) 4 Sheets—Sheet 2.
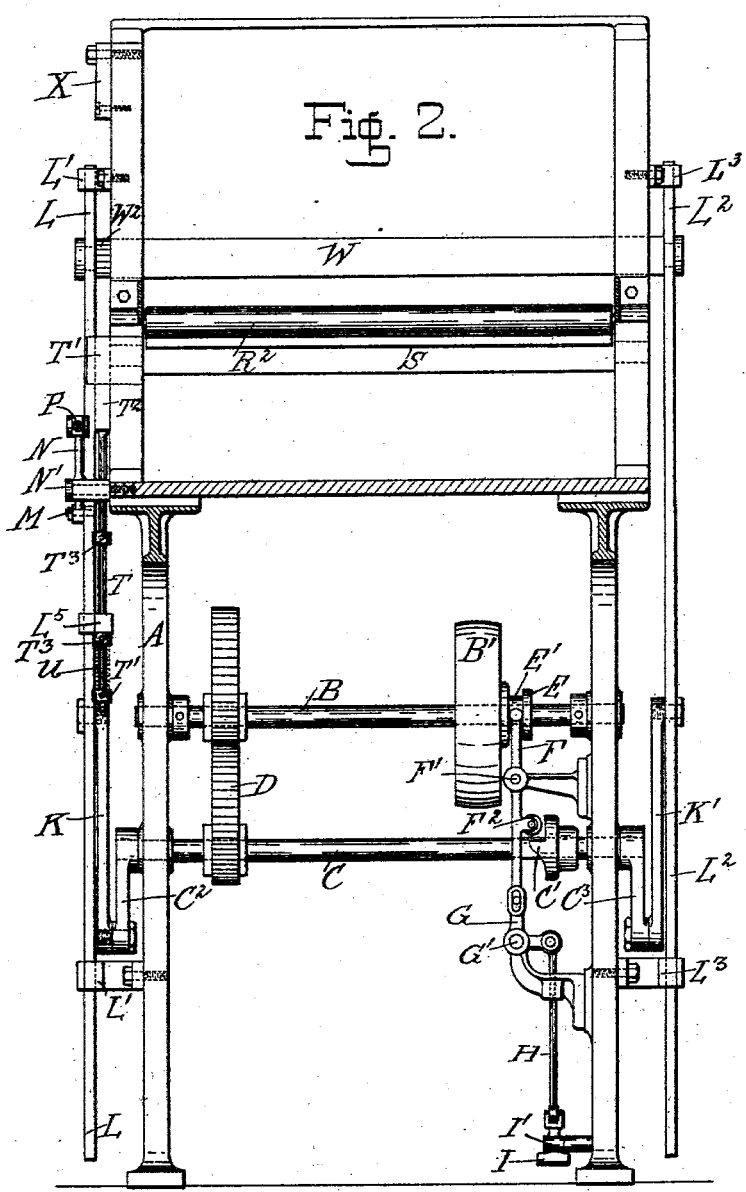
WITNESSES:
John Lotka
Julius Litz
INVENTOR
Francis Simonet
BY
ATTORNEYS No. 633,914. Patented Sept. 26, 1899.
F. SIMONET.
MACHINE FOR CUTTING SUGAR.
(Application filed Jan. 16, 1899.)
(No Model.) 4 Sheets—Sheet 3.
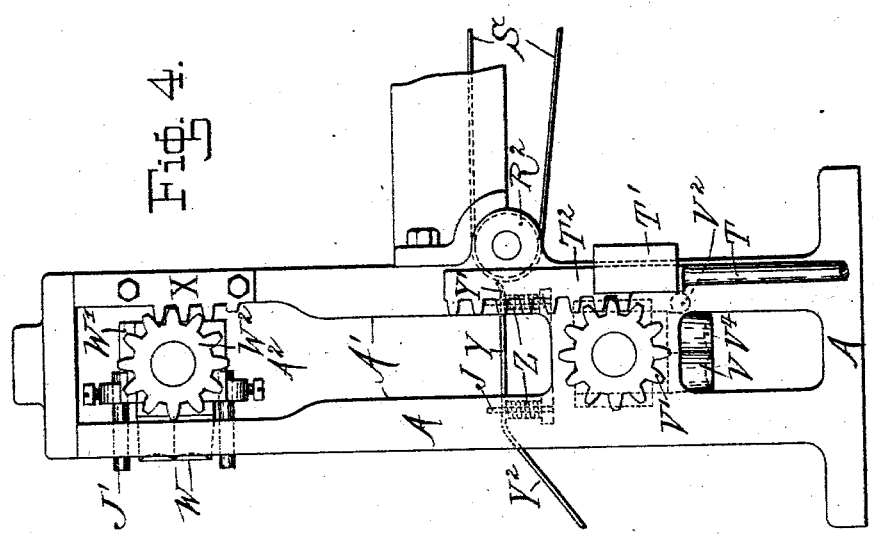
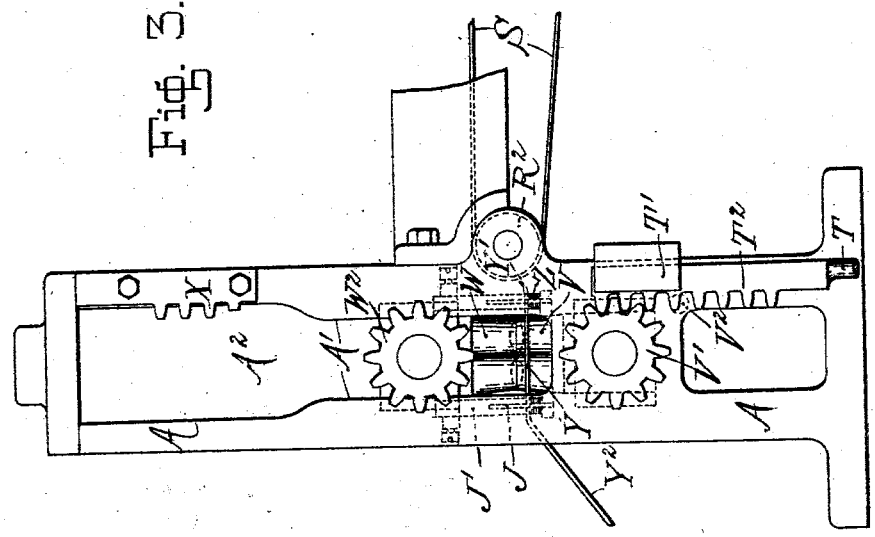
WITNESSES:
John Lotka
Julius Hut
INVENTOR
Francis Simonet.
BY
ATTORNEYS No. 633,914. Patented Sept. 26, 1899.
F. SIMONET.
MACHINE FOR CUTTING SUGAR.
(Application filed Jan. 16, 1899.)

(No Model.) 4 Sheets—Sheet 4.

WITNESSES:
John Lotka
Julius Lutz

INVENTOR
Francis Simonet
BY
Murray
ATTORNEYS

UNITED STATES PATENT OFFICE.

FRANCIS SIMONET, OF NEW YORK, N. Y.

MACHINE FOR CUTTING SUGAR.

SPECIFICATION forming part of Letters Patent No. 633,914, dated September 26, 1899.

Application filed January 16, 1899. Serial No. 702,330. (No model.)

*To all whom it may concern:*

Be it known that I, FRANCIS SIMONET, a citizen of France, residing in the city of New York, borough of Manhattan, in the county and State of New York, have invented new and useful Improvements in Machines for Cutting Sugar, of which the following is a full, clear, and exact description.

My invention relates to machines for cutting sugar when in the nature of a paste, but may be used as well for cutting other plastic materials of a like consistence. The improved machine is primarily intended, however, for use in the manufacture of bonbons or so-called "candy."

The object of my invention is to provide improvements in machines of the above-indicated class for the purpose of obtaining clearly-cut pieces, of more readily cleaning the machine of the waste, and of simplifying the operation.

A construction embodying my invention will be fully described hereinafter and the features of novelty will be pointed out in the appended claims.

Reference is to be had to the accompanying drawings, forming a part of this specification, in which similar characters of reference indicate corresponding parts in all the figures.

Figure 1:
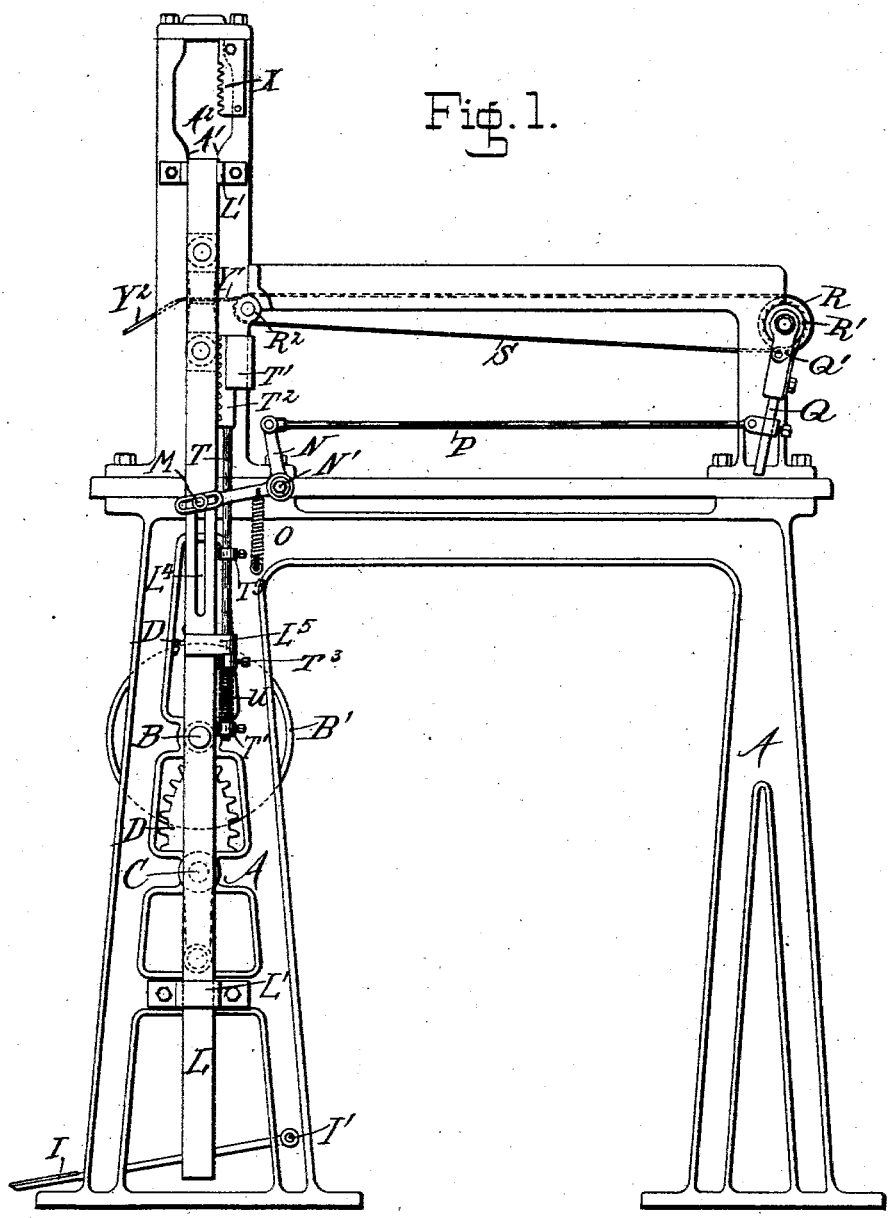
Figure 5:
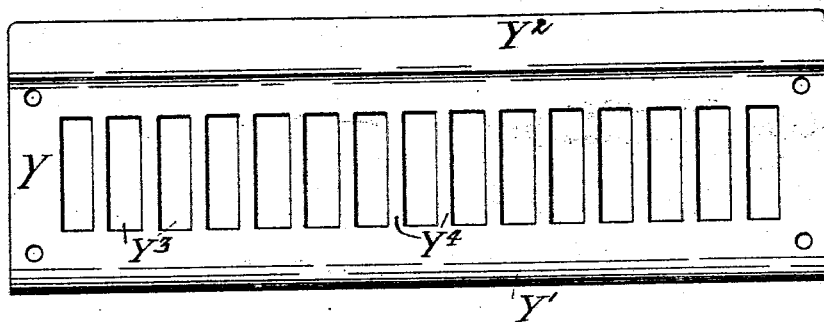
Figure 6:
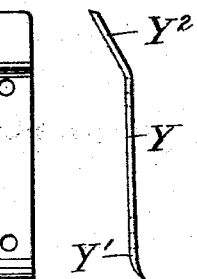
Figure 7:
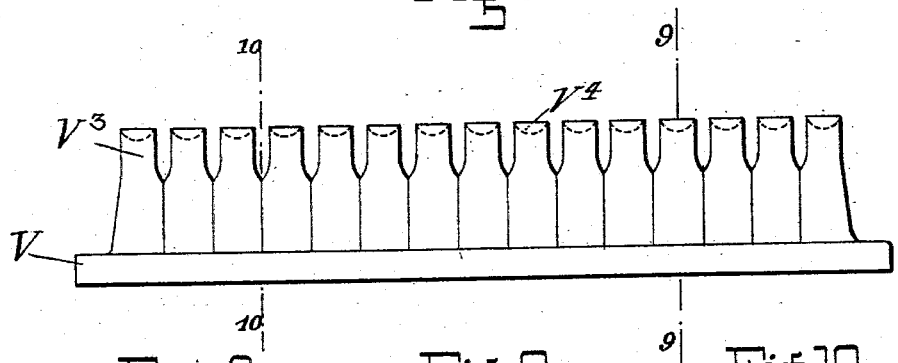
Figure 8:
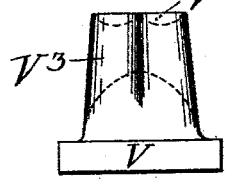
Figure 9:
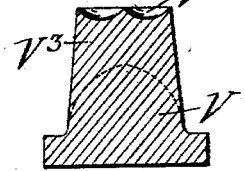
Figure 10:
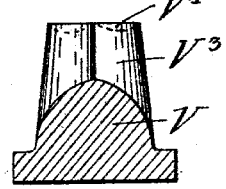

Figure 1 is a side elevation of the improved machine. Fig. 2 is a rear elevation thereof with parts in section. Fig. 3 is an enlarged side elevation of the cutting mechanism and the adjacent parts. Fig. 4 shows the same in a different position. Fig. 5 is a plan of a perforated support forming part of my invention. Fig. 6 is an end view of said support. Fig. 7 is a side view of the lower set of dies. Fig. 8 is an end view thereof; and Figs. 9 and 10 are sections on lines 9 9 and 10 10, respectively, of Fig. 7.

The machine has a suitable frame A, in which is journaled the main shaft B, to which power is applied by a belt passing over the pulley B'. A counter-shaft C is driven from the main shaft B by means of elliptical gear-wheels D. The pulley B' is loose on the shaft B and has a clutch-surface adapted to be engaged by a corresponding surface on the clutch-collar E, held to rotate with the shaft B, but capable of sliding thereon longitudinally. The clutch-collar has a groove E', engaged by one end of a shifting lever F, fulcrumed on the frame at F' and having a pin-and-slot connection at its other end with one arm of a bell-crank lever G, fulcrumed at G'. The other arm of said lever G is connected by a rod H with the pedal I, fulcrumed at I'. The lever F has a side arm carrying a roller $F^2$, projecting into the path of a cam C', rigid upon the counter-shaft C. In Fig. 2 the clutch-collar E is shown in driving engagement with the pulley B'. When the counter-shaft C has completed one revolution, the inclined face of the cam C' will force the roller $F^2$ over to the left, swinging the clutch-collar E away from the pulley B', so that the main shaft B and counter-shaft C will be stopped.

Exteriorly of the frame A the counter-shaft C carries two cranks $C^2$ and $C^3$. One of these cranks, $C^2$, is connected by a rod K with a bar L, adapted to slide vertically in guides L'. The other crank, $C^3$, is similarly connected by a rod K' with a bar $L^2$, sliding in guides $L^3$. The bar L has a slot $L^4$, in which is adjustably secured a pin M, engaged by the slotted end of a bell-crank lever N, fulcrumed at N' and under the control of a spring O. A rod P connects the bell-crank lever with an arm Q, carrying a pawl Q', which engages a ratchet-wheel R' on the shaft of a pulley R, over which passes the apron or conveyer S. Another pulley $R^2$ supports the conveyer at its opposite end. It will be understood that by this means the conveyer will receive an intermittent motion in one direction, so that the upper run of the conveyer will move toward the cutting mechanism, to be described presently.

The bar L has a lug $L^5$, embracing a rod T, sliding in guides T' and provided with a rack $T^2$ and with two stops $T^3$, adapted to be engaged by the lug $L^5$. A spring U is coiled on the rod T, between one of the guides T' and one of the stops $T^3$. It will be understood that the rack $T^2$ will be moved upwardly when the lug $L^5$ engages the upper stop $T^3$ and downwardly when the lug engages the lower stop $T^3$. The rack $T^2$ meshes with a pinion V' on the shaft of the lower die V, which is journaled in the frame A. A stop $V^2$ is located in the path of said die. (See Figs. 3 and 4.)

The bars L and $L^2$ near their upper ends carry the trunnions of the shaft of the upper die W, said shaft having a square portion W', adapted to engage guides A' on the frame A to prevent the die from turning as long as its shaft engages said guides. Above the guides A' is a widened portion $A^2$, allowing the die W to turn when the pinion $W^2$, carried by the shaft of said die, comes in mesh with a stationary rack X, secured to the frame A.

When the parts are in their operative position, Fig. 3, the dies V and W aline with and face each other. In the meeting plane of the two dies (in their operative position) is arranged a supporting-plate Y, one end Y' of which extends close to the conveyer S, so as to constitute a guide for the material from said conveyer to the cutting mechanism formed by the dies V W. The other end $Y^2$ of the supporting-plate is bent downward to cause the cut pieces to slide off. The plate Y might be stationary in the position shown in Fig. 3; but I prefer to arrange the plate movably—for instance, as shown, where the plate slides vertically on pins J and rests on springs Z. In this case the upper die W has tubular guides J', adapted to fit on the pins J, as illustrated by Fig. 3.

The plate Y is perforated to conform with the shape of the dies V W, which are constructed alike. It will be understood that the shape of the dies depends entirely upon the design it is intended to produce. The die shown in detail in Figs. 7 to 10 has a series of spaced projections $V^3$, recessed in their upper surfaces, as at $V^4$, in accordance with the shape of the articles to be produced, and the plate Y has perforations $Y^3$, adapted to register with the projections $V^3$, and bars or ribs $Y^4$, adapted to fit between said projections.

The operation of my improved machine is as follows: When at rest, the parts are in the position shown in Fig. 4—that is, the die V is turned with its face downward and abuts against the stop $V^2$, and the die W is raised and turned sidewise, so that its cutting-surface can be readily cleaned. The supporting-plate Y is in its raised position. The attendant, having spread the sugar or other plastic paste on the conveyer S, depresses the pedal I and thereby swings the levers G and F and with them the clutch-collar E into the driving position shown in Fig. 2, thus starting the shafts B and C. The cranks $C^2$ $C^3$ (which when at rest extend upwardly from the shaft C) are caused to first rotate downward, carrying the bars L $L^2$ in a like direction. This carries the upper die W downward and at the same time during the first part of such downward movement rotates the upper die, owing to the engagement of the pinion $W^2$ with the rack X. During the last part of the downward movement the square portion W' of the shaft of the upper die engages the guides A', and the die W is thus held vertical. The downward movement of bar L, by the engagement of the lug $L^5$ with the lower stop $T^3$, causes a downward movement of the rack $T^2$, thus rotating the pinion V' and with it the lower die V. The two dies are thus swung into registry and are ready to operate on the material. This material is brought upon the plate Y before the dies reach their operative position by the conveyer S, which, as above described, is operated from the bar L through the medium of the ratchet-wheel R', pawl Q', pawl-arm Q, rod P, and bell-crank lever N. While the material is at rest on the plate Y, or practically so, the upper die W comes down upon the material, the tubes J' fitting over the pins J, and the continued downward movement of the die W causes the two dies to meet and at the same time the plate Y to move down into the position shown in Fig. 3, it being understood that the ribs $Y^4$ of the plate Y in passing between the projections $V^3$ of the die V will have a shearing action to remove any waste that may stick to the pieces detached by the dies. The bars L $L^2$ then move upward, releasing the cut pieces and allowing them to slide off the incline $Y^2$ of the plate Y, when the material is again fed forward. The upper die W moves back into the position shown in Fig. 4, so that its working surface may be readily cleaned with a brush or other instrument, while the lower die V in moving back to its lower position will knock against the stop $V^2$, whereby any waste sticking to said die will be thrown off.

It will be seen that the machine will perform very reliable and accurate work and that the mechanism for securing such result is comparatively simple. Furthermore, the machine will stop automatically after each operation, as the cam C' will after each complete revolution of the shaft C throw the clutch-roller E out of engagement with the driving-pulley B'.

I desire it to be understood that various modifications may be made without departing from the nature of my invention as defined in the appended claims.

Having thus described my invention, I claim as new and desire to secure by Letters Patent—

1. The combination of a die journaled in stationary bearings, means for turning said die about its axis, a mating die mounted to move rectilinearly toward and from the first-named die, said mating die being likewise mounted to turn upon its axis, and means for turning the mating die upon its axis when it is farthest away from the first-named die.

2. The combination of a die, a mating die mounted to move rectilinearly toward and from the first-named die, said mating die being also mounted to turn upon its axis, and means for turning the mating die upon its axis when it is farthest away from the first-named die.

3. The combination of a die, a mating die mounted to move rectilinearly toward and from the first-named die, said mating die being also mounted to turn upon its axis, a pinion upon the shaft of said mating die, and a stationary rack arranged to engage said pinion when the dies are farthest apart.

4. The combination with two dies movable one relatively to the other, of a supporting-plate located approximately in the meeting plane of the dies.

5. The combination with two dies movable one relatively to the other, of a supporting-plate located approximately in the meeting plane of the dies and movable relatively to said dies.

6. The combination with two dies movable one relatively to the other, of a supporting-plate located approximately in the meeting plane of the dies, and movable transversely of said plane.

7. The combination with two dies movable one relatively to the other, of a supporting-plate located approximately in the meeting plane of the dies, and a spring carrying said plate yieldingly.

8. The combination with two dies movable one relatively to the other, of a supporting-plate located approximately in the meeting plane of the dies, and perforated for the passage of the die.

9. The combination with two dies movable one relatively to the other, of a supporting-plate located approximately in the meeting plane of the dies, and movable transversely of the said plane, pins projecting from the supporting-plate, and tubular guides projecting from one of the dies and adapted to engage said pins.

10. The combination with two dies movable one relatively to the other, of a supporting-plate located approximately in the meeting plane of the dies, and having its ends bent in opposite directions relatively to said plane.

11. The combination with two dies movable one relatively to the other, of a supporting-plate located approximately in the meeting plane of the dies, and a conveyer adjacent to one end or edge of said plate.

12. The combination of the cutting mechanism, a drive-shaft therefor, a clutch for throwing said shaft into action, a clutch-shifting lever and a pedal for bringing the clutch into the driving position, and a cam operatively connected with the drive-shaft to move in unison therewith, and arranged to engage the clutch-shifting lever to stop the drive-shaft.

FRANCIS SIMONET.

Witnesses:
 EVERARD BOLTON MARSHALL,
 JOHN LOTKA.